United States Patent [19]

Lundquist

[11] 4,168,296
[45] Sep. 18, 1979

[54] EXTRACTING TUNGSTEN FROM ORES AND CONCENTRATES

[76] Inventor: Adolph Q. Lundquist, P.O. Box 1325, Evergreen, Colo. 80439

[21] Appl. No.: 878,880

[22] Filed: Feb. 17, 1978

Related U.S. Application Data

[63] Continuation-in-part of Ser. No. 697,723, Jun. 21, 1976, abandoned.

[51] Int. Cl.² ............................................. C01G 41/00
[52] U.S. Cl. .......................................... 423/56; 423/53
[58] Field of Search ...................... 423/53, 55, 56, 593; 75/101 R, 121

[56] References Cited

U.S. PATENT DOCUMENTS

| | | | |
|---|---|---|---|
| 1,217,914 | 3/1917 | Butterfield | 75/101 R |
| 3,077,379 | 2/1963 | Pilloton | 423/593 |
| 3,271,104 | 9/1966 | Surls | 423/55 |
| 3,607,007 | 9/1971 | Chiola | 423/54 |
| 3,717,697 | 2/1973 | Gillchriest | 423/53 |

OTHER PUBLICATIONS

ChemicaL Abstracts, vol. 62, 1965, abstract No. 3679h, Kulakova V. et al., "Binary Salts in the Production of Tungsten Compounds".
Li, K. et al., Tungsten, A.C.S. Monograph, No. 94, 3rd Edition, Reinhold Pub. Corp., New York, 1955, pp. 183, 184, 189-192.

Primary Examiner—Brian Hearn
Attorney, Agent, or Firm—Wm. Griffith Edwards

[57] ABSTRACT

A process for recovering tungsten from tungsten bearing ores comprises producing a concentrate from the ore and leaching the concentrate at atmospheric pressure in a strong mineral acid solution, for example, a solution of sulfuric acid, hydrochloric acid or nitric acid within a temperature range of from 40° to 90 Centigrade for from one to four hours in the presence of an inorganic complexing agent, and adding an ammonium salt compound for precipitating the tungsten. The precipitate is then dissolved in Ammonium Hydroxide and the tungsten recovered as Ammonium Paratungstate.

16 Claims, 1 Drawing Figure

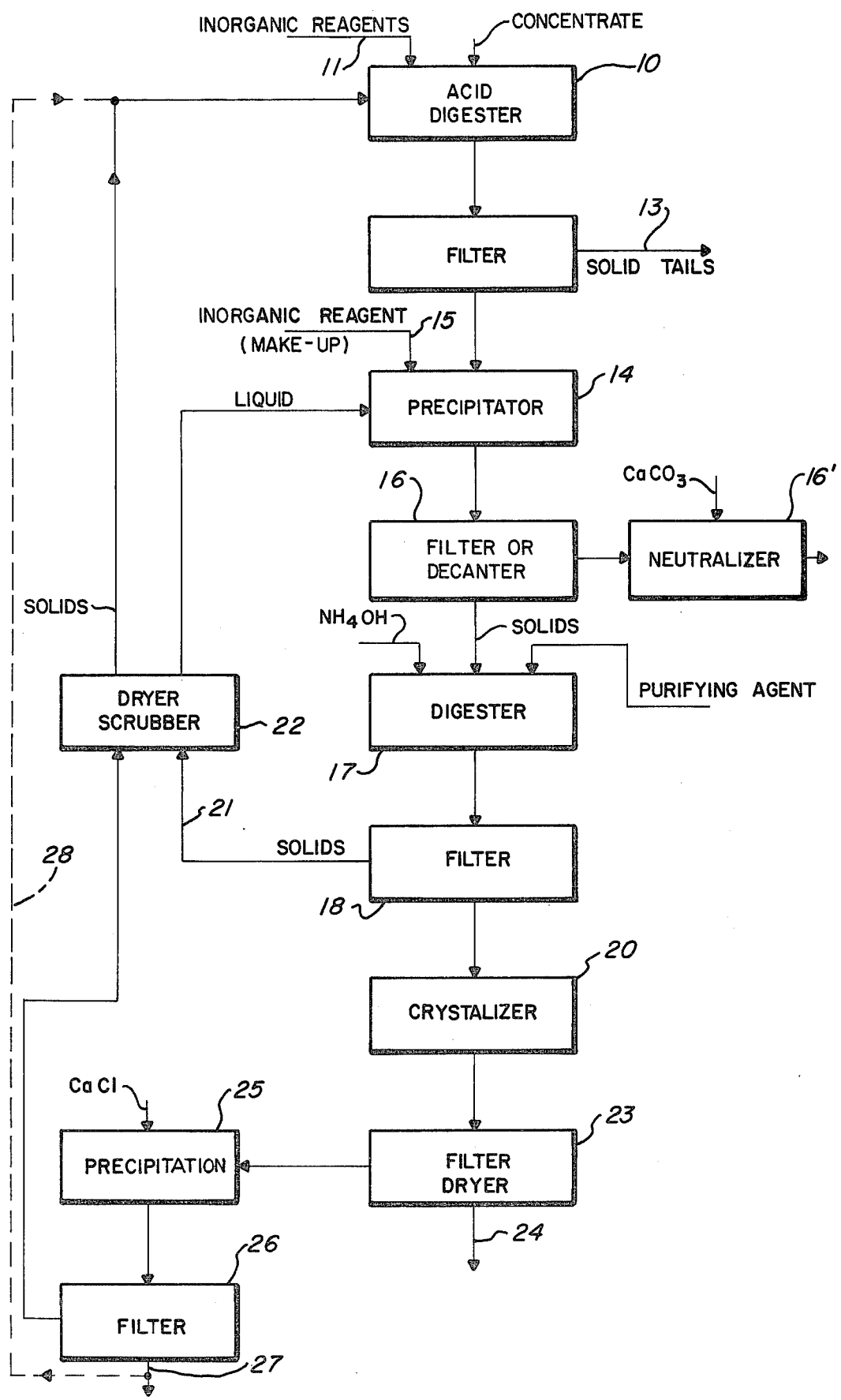

EXTRACTING TUNGSTEN FROM ORES AND CONCENTRATES

This application is a continuation-in-part of my application Ser. No. 697,723 filed June 21, 1976, now abandoned.

This invention relates to the recovery of tungsten from its ore and particularly to an improved hydrometallurgical process for effecting a high recovery of tungsten from tungsten ores and particularly from scheelite.

The principal tungsten ores are wolframite, (FeMn) $WO_4$ and scheelite, $CaWO_4$. Tungsten ore is found chiefly in China but is also found in various other countries. In the United States, the principal sources are in California, Idaho and Nevada. Tungsten is conventionally extracted from its ores by the successive formation of an alkali tungstate, tungstic acid and tungsten trioxide, the reduction of the trioxide with hydrogen to a grey-black metal powder followed by powder metallurgy to provide the metal for direct use or for forming alloys. The costs of recovering the metal from its ores are high and it is desirable to provide higher recovery and greater purity. Accordingly, it is an object of my invention to provide an improved process for extracting tungsten from its ores.

It is a further object of my invention to provide an improved process for recovering tungsten from scheelite.

It is another object of my invention to provide an improved process for effecting high recovery rates of tungsten from scheelite and other ores.

Briefly, in carrying out the objects of my invention in one application thereof, scheelite concentrate is digested in a strong sulfuric acid solution in the presence of synergistic inorganic reagents as a complexing agent to dissolve the tungsten values. A small amount of sodium chloride may be added to enhance the rate at which the tungsten goes into solution. The solution is then separated by filtration or other liquid-solid separation, and the tungsten values are recovered from the solution by precipitation with an ammonium salt compound. The tungsten values are recovered from the barren solution by decantation or filtration, and the tungsten precipitate is dissolved in ammonium hydroxide. Occluded and dissolved impurities are precipitated from the solution by the addition of small amounts of aluminum sulfate or magnesium chloride before clarification of the solution by filtration. The purified and clarified solution is evaporated and the tungsten recovered by crystallization.

The features of novelty which characterize my invention are set forth in the claims annexed to and forming a part of this specification. My invention itself, however, together with further objects and advantages thereof, will best be understood by reference to the following description taken in connection with the accompanying drawing, the single FIGURE of which represents a flow sheet or diagram of the process.

Referring now to the flow sheet, scheelite is first treated by a conventional ore beneficiation process to provide a tungsten concentrate which is supplied to an acid treatment stage 10 where it is subjected to one or more stages of digestion in a strong mineral acid solution, for example, a sulfuric acid, hydrochloric acid, or nitric acid solution at a pH of $-1.0$ to $1.0$ at a temperature within the range of 40° to 90° C. and preferably within the range of 50° to 60° C. and at atmospheric pressures. A complexing agent, which may be a phosphate compound, for example calcium phosphate or phosphate rock or other synergistic inorganic reagent is added to the acid solution through an inlet line 11. The strong mineral acid reacts with the calcium phosphate or phosphate rock to produce phosphoric acid. Phosphoric acid may be used as the complexing agent; however, in general, the use of calcium phosphate or phosphate rock provides a more economical process than that in which the phosphoric acid is used directly as the complexing agent. The tungsten values in the concentrate are thereby dissolved. Particularly when sulfuric acid is used, the rate of dissolving the tungsten values may be enhanced by the addition to the acid solution of a small amount of sodium chloride.

The output from the digestion stage 10 is supplied to a filter 12 which separates solid matter and discharges it as tailings through an outlet 13, the clarified solution being supplied to a precipitation stage 14 to which make-up complexing agent may be added through an inlet line 15. The tungsten values are precipitated by an ammonium salt, for example, ammonium chloride or ammonium sulfate; the solution and the solids thus formed are delivered with the solution to a second separation stage 16 where the solids are separated and delivered to a second digestion stage 17, while the liquid passes to a neutralizing unit 16' where the acid is neutralized by calcium carbonate and passed to the tailings or alternatively is partially recycled or evaporated for recovery of acid.

In the stage 17, the tungsten values are treated with ammonium hydroxide and a purifying agent to convert them to soluble ammonium tungstate and solid impurities and the slurry then flows to a filter 18 from which the liquid including soluble ammonium tungstate flows to a crystallizer 20, the separated solids being delivered through a conveyor 21 to a dryer and scrubber 22. The crystallized ammonium paratungstate then passes to a filter-dryer stage 23 where it is dried and discharged to an outlet conveyor 24 and is ready for packaging.

In order to save any tungsten values dissolved in the filtrate discharged from the filter 23, the filtrate is supplied to a precipitation stage 25 where calcium chloride is added the precipitate the tungsten as calcium tungstate which is filtered from the solution at a filter 26. This product may be removed at outlet 27 and sold as high purity synthetic scheelite or may be returned by a conveyor 28 to the initial digestion stage 10. The filtrate from the filter 26 is delivered to the dryer-scrubber 22, and the solids from the dryer-scrubber are delivered by a conveyor 30 to the digestion stage 10, the liquid being returned from the dryer-scrubber to the precipitation stage 14.

All the residues except the initial tailings from the filter 12 are or may be returned to the digestion circuit, and I have found that the extraction and recovery of ammonium paratungstate from the scheelite concentrate is from 96 percent to 99 percent of the available tungsten in the concentrate provided that the calcium tungstate from the filter 26 is returned to the system.

As an example of my process, and not by way of limitation, I conducted numerous tests using 100 grams of scheelite concentrate which analyzed 29.6 percent $WO_4$. This concentrate was digested in sulfuric acid at a pH ranging from zero to five tenths in a three stage system at 60° C. after adding four grams of phosphate rock ground to 60 mesh on the U.S. Standard Scale and five grams of sodium chloride. The acid treatment was continued for a period of six hours. The acid solution was made by mixing 80 grams of concentrated sulfuric acid in 300 cc of water. The slurry was filtered, the tails going to waste. The filtrate was treated with ammonium chloride to precipitate the tungsten; the slurry was heated until precipitation was complete and was then filtered. The solids were digested in ammonium hydroxide at a pH of 8.5 to 9.0 and magnesium chloride was added to purify the solution. The resulting slurry was then filtered and the tungsten crystallized as ammonium paratungstate. The residue was dried at 400° C. for one hour and recycled to the sulfuric acid digestion stage.

The impurities in the ammonium paratungstate were as follows:

| | |
|---|---|
| Al = .0130% | Pb = .0025% |
| Ce = .0050% | Rb = .0010% |
| Fe = .0130% | Ti = .0005% |
| Mg = .0025% | |

The digestion stage tailings were analyzed at 0.444% $WO_3$ with the heads at 29.6% of $WO_3$; the extraction equalled 98.5%.

In applications of my process, when the concentrate to be treated is from ore other than scheelite, for example, wolframite, the original ore requires a beneficiating roast treatment and leaching before subjecting the tungsten to the mineral acid solution and the remaining treatment of my invention.

While I have described my invention in connection with a specific example, other examples will occur to those skilled in the art, and I do not desire my invention to be limited to the process of the example and I intend, by the appended claims, to cover all processes within the spirit and scope of my invention.

I claim:

1. A process for recovering tungsten values from a calcium tungstate bearing ore which comprises:
   digesting the ore with a solution of strong mineral acid selected from the group consisting of sulfuric acid and nitric acid, at a pH of not greater than 1.0 and a temperature within a temperature range of from 40° to 90° Centigrade for a period within a range of from one to six hours in the presence of a complexing agent, said agent being selected from the group consisting of phosphoric acid, calcium phosphate and phosphate rock,
   adding an inorganic salt containing ammonium radical and selected from the group consisting of ammonium sulphate and ammonium chloride, to the solution to supply ammonium ions for precipitating the tungsten,
   digesting the tungsten precipitate in ammonium hydroxide solution, and
   separating ammonium paratungstate therefrom.

2. The process of claim 1 wherein the step of separating the ammonium paratungstate from the solution is effected by crystallization.

3. The process of claim 1 wherein the temperature is maintained within the range of 50° to 60° Centigrade.

4. The process of claim 1 wherein the step of digesting the tungsten precipitate in ammonium hydroxide is conducted at a pH of from 8.5 to 9.0.

5. The process of claim 1 including the step of returning the solution to the digesting stage after recovery of the tungsten values for use as a portion of the complexing agent.

6. The process of claim 1 wherein said mineral acid is sulfuric acid.

7. The process of claim 6 including the addition of a small amount of sodium chloride with the complexing agent.

8. The process of claim 1 wherein said mineral acid is nitric acid.

9. A process for recovering tungsten values from a calcium tungstate bearing ore which comprises:
   beneficiating the ore to produce a tungsten concentrate,
   digesting the concentrate with a solution of strong mineral acid, selected from the group consisting of sulfuric acid, hydrochloric acid and nitric acid and at a pH of not greater than 1.0, at a temperature within a range from 40° to 90° Centigrade for a period of from one to six hours in the presence of a complexing agent, said agent being selected from the group consisting of phosphoric acid, calcium phosphate and phosphate rock,
   separating the solids from the solution and discharging the solids as tailings,
   adding to the solution an inorganic salt containing ammonium ions and selected from the group consisting of ammonium sulphate and ammonium chloride for precipitating the tungsten,
   separating the precipitate from the solution,
   digesting the precipitate in an ammonium hydroxide solution in the presence of a purifying agent selected from the group consisting of aluminum sulphate and magnesium chloride,
   filtering the hydroxide solution and recovering the tungsten as ammonium paratungstate,
   adding calcium chloride to the purified solution to precipitate any tungsten remaining in the solution and filtering the solution and returning the precipitate to the acid digestion stage and recovering soluble tungstate.

10. The process of claim 9 wherein said acid digesting stage is at atmospheric pressure and said temperature is in the range of 50° to 60° Centigrade.

11. The process of claim 9 wherein a small amount of sodium chloride is added to the solution in the acid digesting stage for enhancing the rate at which tungsten goes into solution.

12. The process of claim 9 wherein said mineral acid is sulfuric acid.

13. The process of claim 9 wherein said mineral acid is hydrochloric acid.

14. The process of claim 9 wherein said mineral acid is nitric acid.

15. A process for recovering tungsten values from scheelite ore which comprises:
   beneficiating the ore to obtain a tungsten concentrate,
   digesting the concentrate with a solution of strong mineral acid selected from the group consisting of sulfuric acid and nitric acid and at a pH of not greater than 1.0 at a temperature within the range of 40° to 90° Centigrade for a period of from one to six hours in the presence of a complexing agent, said agent being selected from the group consisting of phosphoric acid, calcium phosphate and phosphate rock,
   separating the solids from the solution, and recovering the tungsten from the solution.

16. The process of claim 15 wherein the acid is sulfuric acid and including the addition of a small amount of sodium chloride to the solution in the digesting stage for enhancing the rate at which tungsten goes into solution.

* * * * *